US012570038B2

(12) United States Patent
Courtial et al.

(10) Patent No.: US 12,570,038 B2
(45) Date of Patent: Mar. 10, 2026

(54) METHOD FOR ADDITIVE MANUFACTURING IN AN ADJUSTABLE CONSTRAINED MEDIUM

(71) Applicants:CENTRE NATIONAL DE LA RECHERCHE SCIENTIFIQUE, Paris (FR); UNIVERSITE CLAUDE BERNARD LYON 1, Villeurbanne (FR); INSTITUT NATIONAL DES SCIENCES APPLIQUEES DE LYON, Villeurbanne (FR); ECOLE SUP CHIMIE PHYS ELECTRONIQ LYON, Villeurbanne (FR)

(72) Inventors: Edwin-Joffrey Courtial, Villeurbanne (FR); Christophe Marquette, Villeurbanne (FR); Arthur Colly, Villeurbanne (FR); Julien Barthes, Strasbourg (FR)

(73) Assignees: CENTRE NATIONAL DE LA RECHERCHE SCIENTIFIQUE, Paris (FR); UNIVERSITE CLAUDE BERNARD LYON 1, Villeurbanne (FR); INSTITUT NATIONAL DES SCIENCES APPLIQUEES DE LYON, Villeurbanne (FR); ECOLE SUP CHIMIE PHYS ELECTRONIQ LYON, Villeurbanne (FR)

( * ) Notice: Subject to any disclaimer, the term of this patent is extended or adjusted under 35 U.S.C. 154(b) by 136 days.

(21) Appl. No.: 17/998,837

(22) PCT Filed: May 14, 2021

(86) PCT No.: PCT/EP2021/062808
§ 371 (c)(1),
(2) Date: Nov. 15, 2022

(87) PCT Pub. No.: WO2021/229046
PCT Pub. Date: Nov. 18, 2021

(65) Prior Publication Data
US 2023/0202095 A1    Jun. 29, 2023

(30) Foreign Application Priority Data

May 15, 2020    (FR) ................................. FR2004883

(51) Int. Cl.
*B29C 64/118*        (2017.01)
*B29C 64/209*        (2017.01)
        (Continued)

(52) U.S. Cl.
CPC .......... *B29C 64/118* (2017.08); *B29C 64/209* (2017.08); *B29C 64/232* (2017.08);
        (Continued)

(58) Field of Classification Search
None
See application file for complete search history.

(56) References Cited

U.S. PATENT DOCUMENTS 11,192,292 B2 * 12/2021 Fernandez-Nieves ......................
                                            B29C 64/153
11,654,612 B2 * 5/2023 Fernandez-Nieves ......................
                                            B33Y 30/00
                                            264/405
(Continued)

FOREIGN PATENT DOCUMENTS

EP        3616865 A1    3/2020
JP     2003-533367 A    11/2003
        (Continued)

OTHER PUBLICATIONS

International Search Report for International Application No. PCT/EP2021/062808, mailed Oct. 13, 2021, 5 pages with English Translation.
        (Continued)

*Primary Examiner* — Xiao S Zhao
*Assistant Examiner* — Nicholas J Chidiac
(74) *Attorney, Agent, or Firm* — TraskBritt

(57)        ABSTRACT

Methods for additive manufacturing include depositing a printing material in suspension within a printing tray containing a stressed medium, to form a three-dimensional
        (Continued)

object. This deposition of printing material is performed via at least one step of injecting the printing material using a nozzle of a printing head, which nozzle is immersed in the stressed medium and is able to move within the stressed medium in the three dimensions in space. This method comprises at least a step of modifying the level of the stressed medium in the printing tray. Additive manufacturing devices includes a stressed medium disposed in a printing tray, a printing head designed to dispense a printing material, and a device for modifying the level of the stressed medium of the printing tray. The printing head has a nozzle displaceable within the stressed medium in three spatial dimensions.

11 Claims, 4 Drawing Sheets

(51) Int. Cl.

| | | |
|---|---|---|
| *B29C 64/232* | (2017.01) | |
| *B29C 64/236* | (2017.01) | |
| *B33Y 10/00* | (2015.01) | |
| *B33Y 30/00* | (2015.01) | |

(52) U.S. Cl.
CPC ............ *B29C 64/236* (2017.08); *B33Y 10/00* (2014.12); *B33Y 30/00* (2014.12)

(56) References Cited

U.S. PATENT DOCUMENTS

| | | | |
|---|---|---|---|
| 2003/0090034 A1 | 5/2003 | Rolf et al. | |
| 2008/0145639 A1* | 6/2008 | Sun ....................... | B29C 64/118 428/304.4 |
| 2017/0120334 A1* | 5/2017 | DeMuth ................. | B22F 12/70 |
| 2017/0361534 A1* | 12/2017 | Fernandez-Nieves ...................... | B29C 64/40 |
| 2018/0057682 A1 | 3/2018 | Angelini et al. | |
| 2021/0402685 A1 | 12/2021 | Marquette et al. | |
| 2022/0031848 A1* | 2/2022 | Ogle ...................... | A61K 47/24 |
| 2022/0055287 A1* | 2/2022 | Fernandez-Nieves ...................... | B29C 64/259 |
| 2022/0364033 A1* | 11/2022 | Visser ...................... | A61L 27/38 |
| 2022/0401624 A1* | 12/2022 | Alimperti ............. | B33Y 70/00 |
| 2023/0384037 A1* | 11/2023 | Hayes ...................... | F28F 21/08 |
| 2025/0026048 A1* | 1/2025 | Kravchenko ........... | B32B 27/12 |

FOREIGN PATENT DOCUMENTS

| | | | |
|---|---|---|---|
| WO | 2012111655 | A1 | 8/2012 |
| WO | 2017081040 | A1 | 5/2017 |
| WO | 2020109745 | A1 | 6/2020 |

OTHER PUBLICATIONS

International Written Opinion for International Application No. PCT/EP2021/062808, mailed Oct. 13, 2021, 9 pages with English Machine Translation.
Annex to European Communication pursuant to Article 71(3) EPC for European Application No. 21724340.1, dated Nov. 3, 2025, 2 pages with English machine translation.
European Communication pursuant to Article 71(3) EPC for European Application No. 21724340.1, dated Nov. 3, 2025, 10 pages with English machine translation.
Japanese Notice of Reasons for Refusal for Japanese Application No. 2022-570129, dated Nov. 20, 2025, 14 pages with English translation.

\* cited by examiner

METHOD FOR ADDITIVE MANUFACTURING IN AN ADJUSTABLE CONSTRAINED MEDIUM

CROSS-REFERENCE TO RELATED APPLICATIONS

This application is a national phase entry under 35 U.S.C. § 371 of International Patent Application PCT/EP2021/062808, filed May 14, 2021, designating the United States of America and published as International Patent Publication WO 2021/229046 A1 on Nov. 18, 2021, which claims the benefit under Article 8 of the Patent Cooperation Treaty to French Patent Application Serial No. FR2004883, filed May 15, 2020.

TECHNICAL FIELD

This disclosure relates to the field of additive manufacturing, likewise referred to as "three-dimensional printing" or "3D printing." More particularly, the disclosure relates to additive manufacturing within a stressed medium.

BACKGROUND

Among the known additive manufacturing methods, some methods are distinguished by depositing material and shaping it within a printing tray containing a stressed medium that performs the function of holding the printed material. In these methods, printed material intended to form a three-dimensional object is deposited by a printing head that is movable in the three spatial dimensions and has a nozzle that is dipped into a stressed medium formed of a material that surrounds and contains the three-dimensional object in the course of formation.

Patent Application Publication US 2018/0057682 A1, published Mar. 1, 2018, describes such an additive manufacturing method implementing a stressed medium. In this method, a silicone-based ink is deposited in the liquid state in a stressed medium made up of a gel. The interfacial surface tension between the silicone and the gel is conducive to printing the silicone-based ink with the gel as suspension phase, thereby making it possible to print silicone parts.

Furthermore, Patent Application Publication WO 2020/109745 A1, published Jun. 4, 2020, likewise describes such an additive manufacturing method in which a printing material is deposited within a granular phase acting as stressed medium.

These methods make it possible to manufacture parts from a printing material exhibiting flow properties that are not designed, or are insufficiently designed, for conventional additive manufacturing methods. For example, acceptable printing materials for these methods are very fluid silicones, which cannot be printed using conventional methods, such as fused deposition modeling (FDM) methods, liquid deposition modeling (LDM) methods, multi jet printing (MJP) methods, stereolithography apparatuses (SLA), selective laser melting (SLM), selective laser sintering (SLS), electron beam melting (EBM), and binder jetting methods, these methods all being fundamentally different from additive manufacturing methods in a stressed medium.

BRIEF SUMMARY

The aim of embodiments of the disclosure is to improve the additive manufacturing devices and methods of the prior art.

For this purpose, the disclosure concerns an additive manufacturing method including the deposition of a printing material in suspension within a printing tray containing a stressed medium to form a three-dimensional object, this deposition of printing material being realized via at least one step of injecting printing material through a nozzle of a printing head that is dipped into the stressed medium and can be moved within the stressed medium in the three spatial dimensions. This method has at least one step of modifying the level of the stressed medium in the printing tray.

According to another subject, the disclosure concerns an additive manufacturing device, having:
- a stressed medium disposed in a printing tray;
- a printing head designed to dispense a printing material, this printing head having a nozzle designed to be displaced within the stressed medium in the three spatial dimensions; and
- a device for modifying the level of the stressed medium of the printing tray.

The method and the device according to embodiments of the disclosure first of all enable better-quality 3D printing by adapting the compressive force to which the nozzle is subjected during the printing.

In addition, such a method opens up new perspectives on additive manufacturing methods in a stressed medium. These additive manufacturing methods in a stressed medium thus make it possible not only to print parts from difficult printing materials (for example, low-viscosity materials, materials with an insufficient threshold stress, or materials exhibiting notable thixotropic behavior) but make it possible moreover to modulate the physical characteristics of the printed part.

In the present description and the claims, the term "printing" is utilized to refer to the production of a part by an additive manufacturing method, the expression "printed material" refers to the material that is shaped during this method and that makes up all or some of the manufactured part, and the expression "constraining material" refers to the material present in the printing tray, which material makes up the stressed medium and is, therefore, intended to surround and exert pressure on the part produced in the printing material.

Such an additive manufacturing method makes it possible to act not only on the shapes of the part obtained, by controlling the printing head, but also on certain physical properties of the part, by controlling the level of the stressed medium.

For different parts printed on the basis of an identical three-dimensional model, different parametrizing relating notably to the variation of the level of the stressed medium in the printing tray will result in parts having the same shape but exhibiting different physical properties.

It is thus possible, from the same printing material, to obtain parts exhibiting, for example, different mechanical characteristics, simply by parametrizing the method. An additive manufacturing device implementing such a method will, therefore, for example, be able to be supplied by a single source of printing material and the user will be able to choose between various physical properties desired for the final part, and these physical properties will be applied solely by parametrizing the machine, without modifying the supply of printing material. The mechanical properties of a part are, for example, physical properties that can be modulated by virtue of the method.

Various parts can, therefore, be obtained with, for example, different mechanical characteristics, from the same printing material. As an alternative, it is possible to obtain one and the same part having various mechanical characteristics within it. Specifically, the method makes it possible to vary the mechanical characteristics of a portion of the part by controlling the level of the stressed medium such that the final part, although it is made up of one and the same printing material, has portions exhibiting different local characteristics adapted to the use of the part.

On another note, as an example of physical properties that can be modulated by virtue of the method, the method makes it possible by contrast to obtain parts that are very homogeneous from the point of view of mechanical properties by controlling, in this case, the level of the stressed medium to ensure that all the portions of the part have exactly the same mechanical properties.

The method according to embodiments of the disclosure may have the following additional features, taken on their own or in combination:

the method has a step of adjusting the stress exerted by the stressed medium on the printing material;

during a step of modifying the level of the stressed medium in the printing tray, a layer of constraining material identical to the material making up the stressed medium in the printing tray is deposited on the surface of the stressed medium;

during a step of modifying the level of the stressed medium in the printing tray, a layer of constraining material different than the material making up the stressed medium in the printing tray is deposited on the surface of the stressed medium;

the deposition of a layer of constraining material on the stressed medium is realized by diffusion over the entire surface of the stressed medium;

the deposition of a layer of constraining material on the stressed medium is realized by a movable diffusion head;

during a step of modifying the level of the stressed medium in the printing tray, a head support bearing the printing head and the diffusion head is displaced facing the entire surface of the stressed medium, the printing head being deactivated and the diffusion head being activated;

during a step of modifying the level of the stressed medium in the printing tray, a layer of material of the stressed medium is extracted from the printing tray;

the extraction of a layer of material of the stressed medium is realized by suction over the entire surface of the stressed medium;

the suction is performed by a movable removal head;

during a step of modifying the level of the stressed medium in the printing tray, a head support bearing the printing head and the removal head is displaced facing the entire surface of the stressed medium, the printing head being deactivated and the removal head being activated;

the method having the following successive steps: a step of printing a portion of the three-dimensional object; a step of varying the level of the stressed medium in the printing tray; a step of printing another portion of the three-dimensional object;

the method has the following steps: a preliminary calibration step, in which the relationship between a predetermined physical characteristic and the printing depth in the stressed medium is determined; a step of selecting printing depths corresponding to predetermined values for the physical characteristic; steps of printing a part in the stressed medium, at levels of the stressed medium corresponding to the printing depths selected.

the stressed medium exhibits a flow property;

the stressed medium is made up of a granular stressed material;

the stressed medium is made up of a gel;

the printing material is a curable material.

The device according to embodiments of the disclosure may have the following additional features, taken on their own or in combination:

a movable diffusion head designed to deposit a layer of constraining material on the stressed medium;

the diffusion head has controlled distribution means for the controlled distribution of constraining material;

a head support bearing the printing head and the diffusion head, the head support being displaceable facing the entire surface of the stressed medium in a mode in which the printing head is deactivated and the diffusion head is activated;

a reservoir of constraining material containing a material identical to the material making up the stressed medium in the printing tray, this reservoir supplying the diffusion head;

a reservoir of constraining material containing a material different than the material making up the stressed medium in the printing tray, this reservoir supplying the diffusion head;

a movable removal head designed to remove a layer of material of the stressed medium;

the removal head is connected to suction means;

a head support bearing the printing head and the removal head, the head support being displaceable facing the entire surface of the stressed medium in a mode in which the printing head is deactivated and the removal head is activated;

a reservoir of constraining material, the removal head supplying this reservoir;

the stressed medium in the printing tray exhibits a flow property;

the stressed medium in the printing tray is made up of a granular stressed material;

the stressed medium in the printing tray is made up of a gel.

BRIEF DESCRIPTION OF THE DRAWINGS

Other features and advantages of embodiments of the disclosure will become apparent from the following non-limiting description, with reference to the appended drawings, in which.

5

Figure 1:
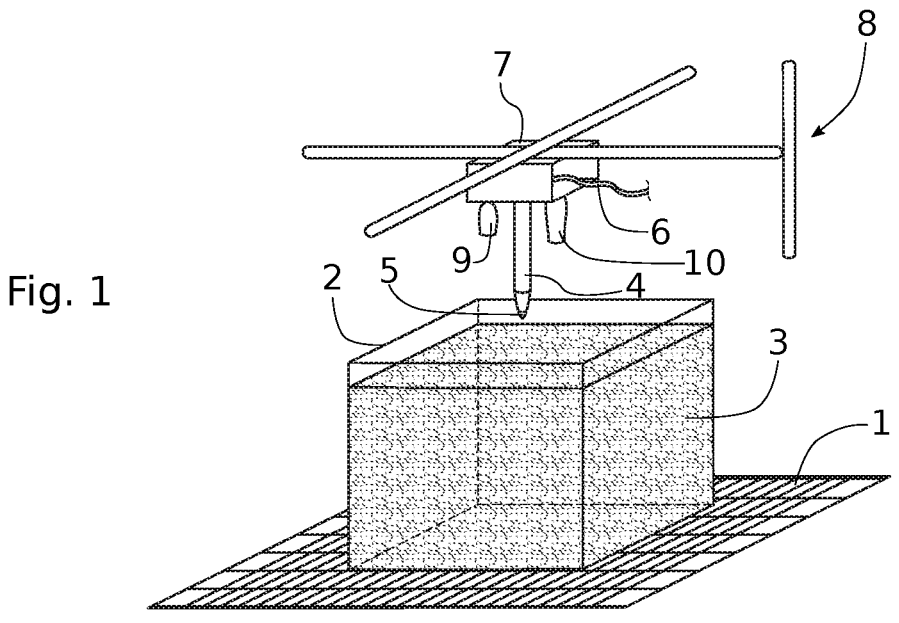
FIG. 1 illustrates an additive manufacturing device according to embodiments of the disclosure.
Figure 8:
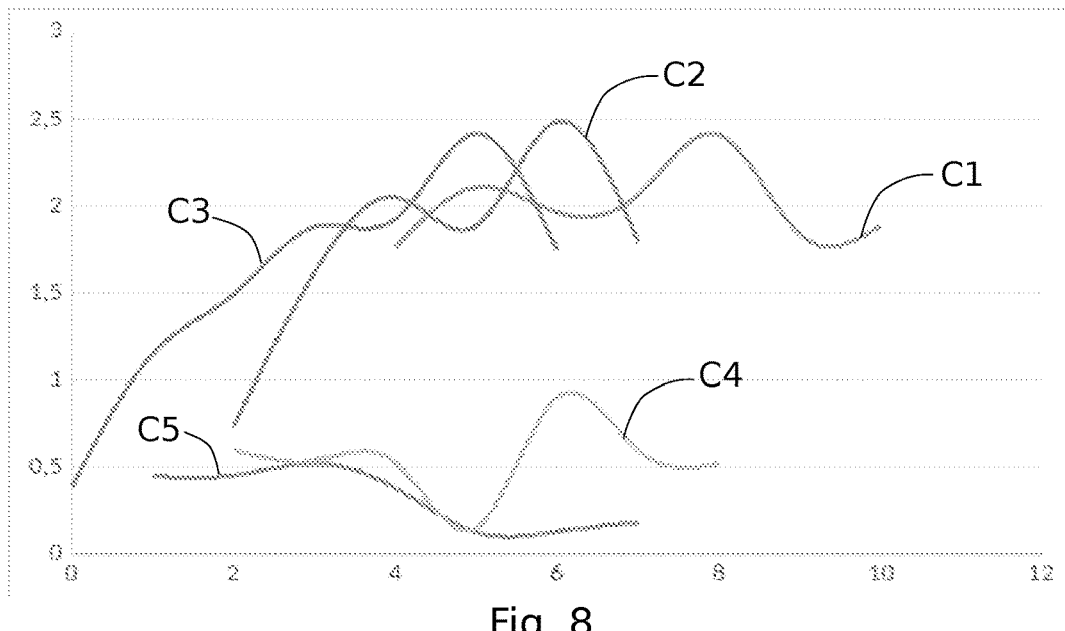
Figure 9:
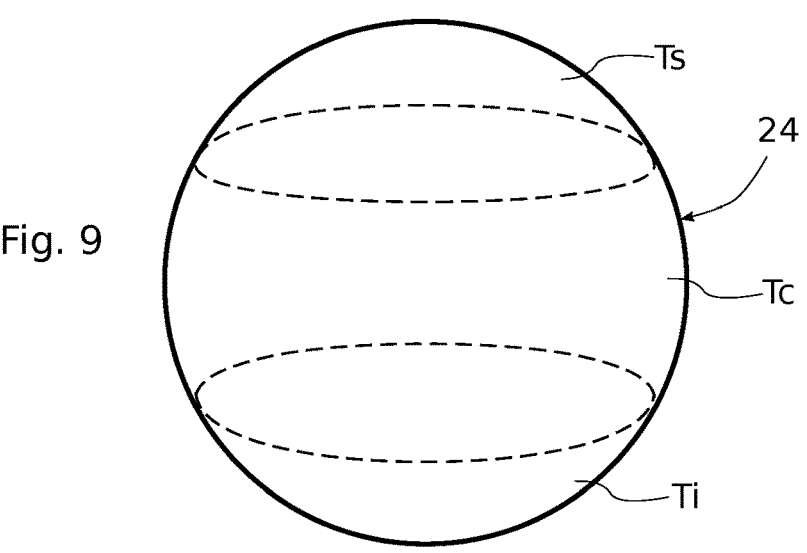
Figure 10:
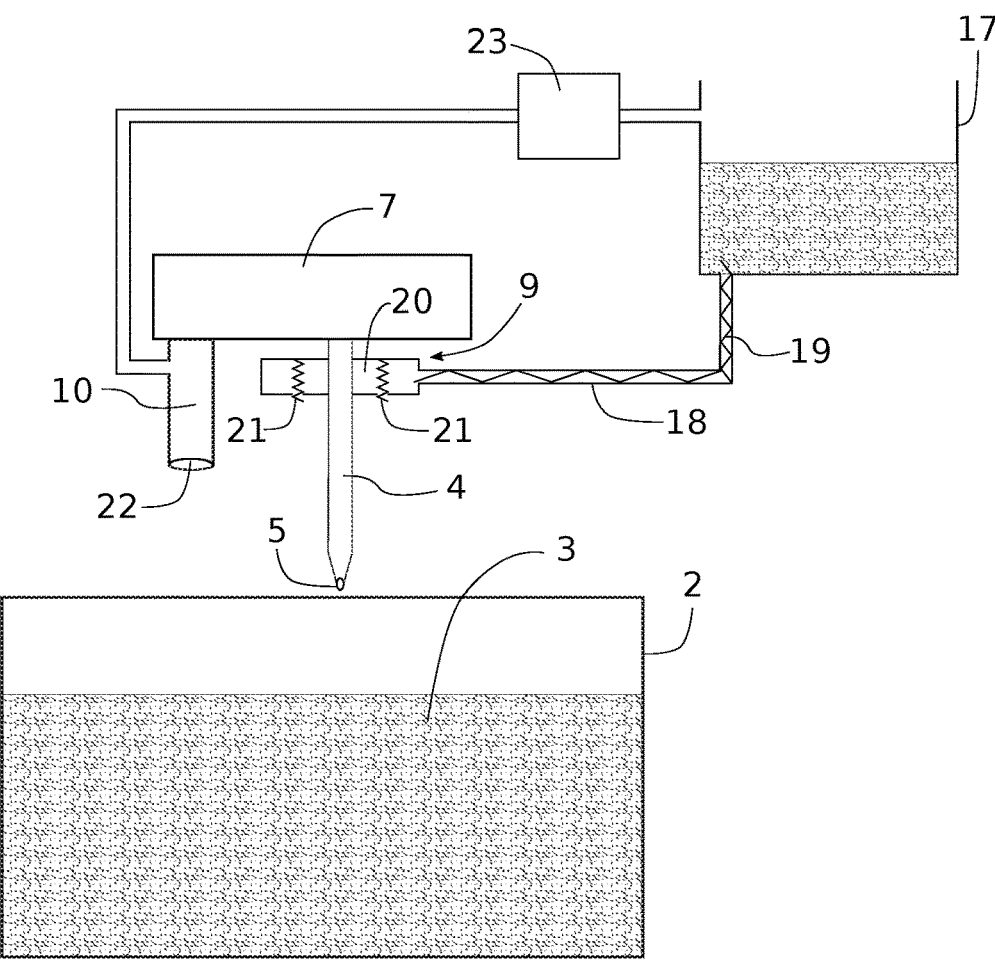
Figure 11:
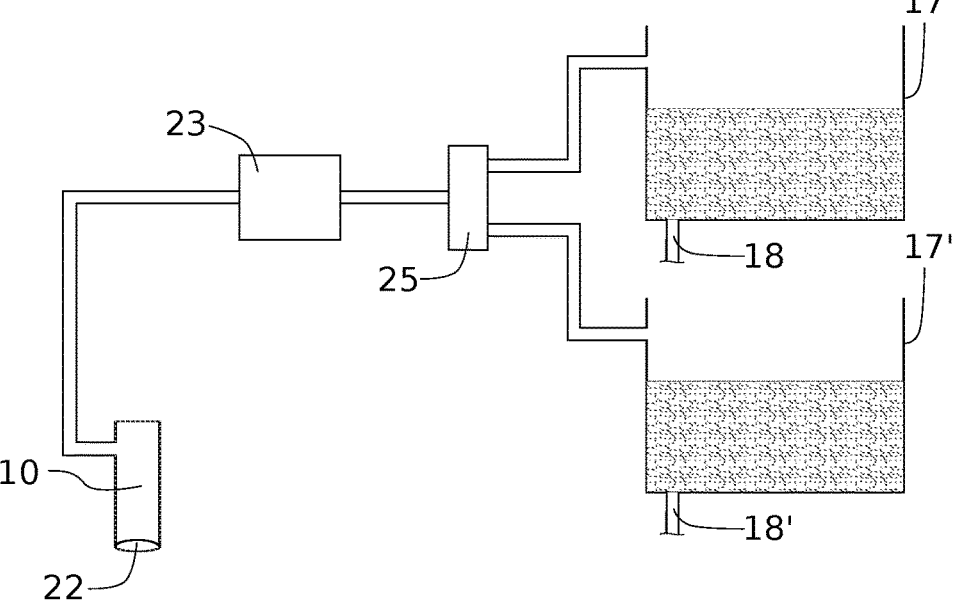

FIG. 8 is a graph illustrating the relationship between the elasticity of a printed part, the printing depth, and the constraining material;

FIG. 9 illustrates a sphere obtained with the device of FIG. 1;

FIG. 10 illustrates a detail of the means incorporated in the device of FIG. 1 for varying the level of the stressed medium; and FIG. 11 illustrates a variant of the means of FIG. 10.

DETAILED DESCRIPTION

FIG. 1 illustrates an additive manufacturing device according to embodiments of the disclosure. This device has a printing plate 1 on which is disposed a printing tray 2 containing a stressed medium 3. In practice, the printing plate 1 may be, for example, a one-meter-squared aluminum plate, like that of the 3D printer sold by the company TOBECA under the reference 101015. The printing tray 2 may be, for example, a plastic box, referred to as multi box, sold by LEROY-MERLIN under the reference 68993750. The device also has a printing head 4 provided with a nozzle 5. The term "nozzle" denotes specifically the outlet for dispensing the printing material. The nozzle 5 and a portion of the printing head 4 are dipped, throughout the process of printing a part, into the stressed medium and are displaced within this stressed medium with movements that enable the deposition of the printing material. The printing head 4 is supplied with printing material by a supply device 6, schematically shown here simply by way of a supply conduit. The supply device may be any known means used in 3D printing, such as a circuit with a pump or pressure device providing the printing material in liquid form, a mechanical distributor providing the printing material in the form of a continuous filament or of granules to be melted in the printing head 4, etc. Irrespective of the supply device 6 used, the printing head 4 is designed to dispense the printing material in sufficiently fluid form through its nozzle 5 in order for the material to be printed. The printing head 4 may be, for example, that sold by the company VISCOTEC under the reference vipro-HEAD3 and the nozzle 5 may be, for example, an Optimum deposition needle sold by the company Nordson EFD.

The printing material is a curable material, that is to say that it solidifies after having been deposited within the stressed medium. The printing material may be, for example, a molten material dispensed by a heating printing head, this material solidifying as it cools, or a polymer that is cross-linkable following a chemical reaction, the evaporation of a solvent, or by exposure to radiation such as UV light. For example, the printing material may be a silicone of mono-component type (polycondensation) or bi-component type (polyaddition).

The printing device has means enabling its relative displacement, in the three spatial directions, between the nozzle 5 and the printing tray 2. In the present example, the printing head 4 is mounted on a head support 7 connected to slideways 8 enabling the displacement of the head support 7 in three orthogonal translations. As a variant, any other device that can move the printing plate 1 and/or the head support 7 in translation and/or rotate them/it may be provided as a variant, provided that it makes it possible to be able to move the nozzle 5 within the stressed medium 3 in the three spatial directions. Notably, the printing head 4 may be displaced, for example, by a robotic arm with six axes for angularly orienting the nozzle within the stressed medium.

The stressed medium 3 exhibits flow properties, that is to say that the stressed medium 3 is made up of a material that conforms to the shape of the container in which it is placed. For example, the stressed medium is a granular medium, a liquid or gelled medium, or a foam. In the present example, the stressed medium 3 is a granular stressed medium that is made up of a solid granular phase and an interstitial gaseous phase. The granular phase is a mass of discrete solid elements. Because of its pulverized and non-cohesive nature, this mass conforms to the shape of the printing tray 2 by virtue of the spontaneous arrangement of these discrete elements, which bear against one another under the effect of their own weight. The discrete elements interact with one another by bearing against regions of contact between each discrete element and the discrete elements surrounding it. The granular stressed medium has these discrete elements and, between the discrete elements, the interstitial gaseous phase. The mechanical behavior of the granular stressed medium is due only to the modification of the points of contact between the discrete elements and is not influenced by the interstitial gaseous phase, the latter contributing to the mechanical behavior of the granular stressed medium only insofar as it makes it possible to modify the regions of contact between discrete elements.

As a variant, embodiments of the disclosure may be implemented with any other stressed medium, such as a gel. The advantage of the granular stressed medium over the gel is that it is not subject to buoyancy, making it possible to not alter the geometric dimensions of the object in the course of printing and until it is removed from the stressed medium.

It follows that the stressed medium 3, whether it is granular or not, may be made up of numerous types of materials, including: silica, cenospheres, PMMA, sodium bicarbonate, sugar, sand, Pluronic F127 (gel), Carbopol, gelatin, etc., provided it exhibits flow properties. These different materials may likewise be mixed in various proportions. The printing device moreover has a diffusion head 9 and a removal head 10, both of which are designed to act on the level of the stressed medium.

The diffusion head 9 is designed to discharge, into the printing tray 2, a constraining material making it possible to increase the level of the stressed medium 3. In the present example, in which the stressed medium 3 is a granular stressed medium formed, for example, by solid polymer particles, the diffusion head 9 is designed to diffuse a sufficient amount of these polymer particles at the surface of the stressed medium 3. The head support 7 is then controlled to displace the diffusion head 9 to that end. The diffusion head 9 has a diffusion stopping and starting mechanism, and a mechanism for supplying polymer particles (which is not shown).

The removal head 10 acts conversely to the diffusion head 9 by making it possible to remove the polymer particles at the surface of the stressed medium 3. In the present example, the removal head 10 is connected to suction means (not shown) or to any suitable means for drawing in the polymer particles present at the surface of the stressed medium 3, the head support 7 then being controlled to displace the removal head 10 over the entire surface of the stressed medium 3.

The additive manufacturing device notably has three operating modes that are implemented in combination during the 3D printing of a part:

a printing mode, in which the head support 7 is controlled to dip the nozzle 5 into the stressed medium 3 and in which the movement of the head support 7 is controlled such that the various layers of printing material are disposed on one another in succession within the stressed medium 3, so as to form the part to be printed. During this printing mode, the diffusion head 9 and the removal head 10 are inactive. As a variant, the diffusion head 9 and/or the removal head 10 may be activated during the printing mode to enable the addition or the removal of polymer particles to or from the constraining medium, at the same time as the printing;

a diffusion mode, in which the head support 7 is controlled to sweep the entire surface of the stressed medium 3 in order that the polymer particles dispensed by the diffusion head 9 are evenly spread over the surface of the stressed medium 3 in such a way that the level of the stressed medium 3 in the printing tray 2 increases, that is to say that the height of the surface of the stressed medium 3 increases. In this mode, the removal head 10 is inactive, as is the printing head 4, that is to say that no printing material is dispensed by its nozzle 5;

a removal mode, in which the printing head 4 and the diffusion head 9 are inactive whereas the removal head 10 is activated and the head support 7 sweeps the surface of the stressed medium 3 so as to evenly suck up a layer of polymer particles, thereby reducing the level of the stressed medium 3 in the printing tray 2.

Figure 2:
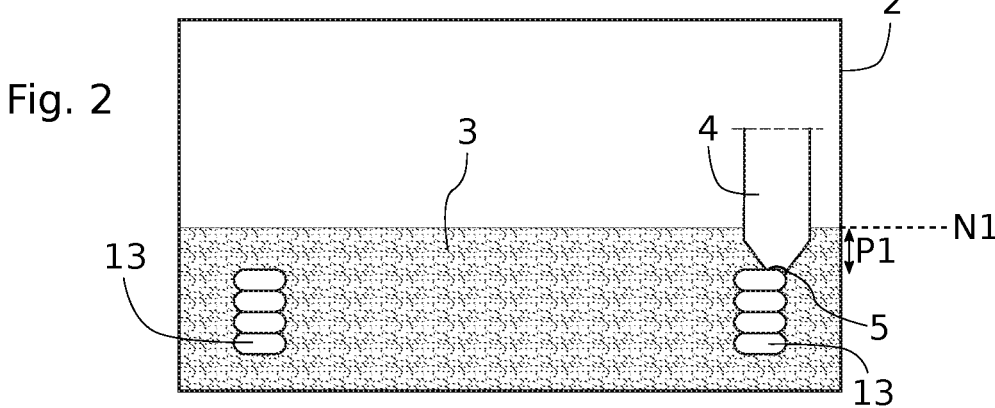
FIG. 2 illustrates a step of printing a first part with the device of FIG. 1.
Figure 3:
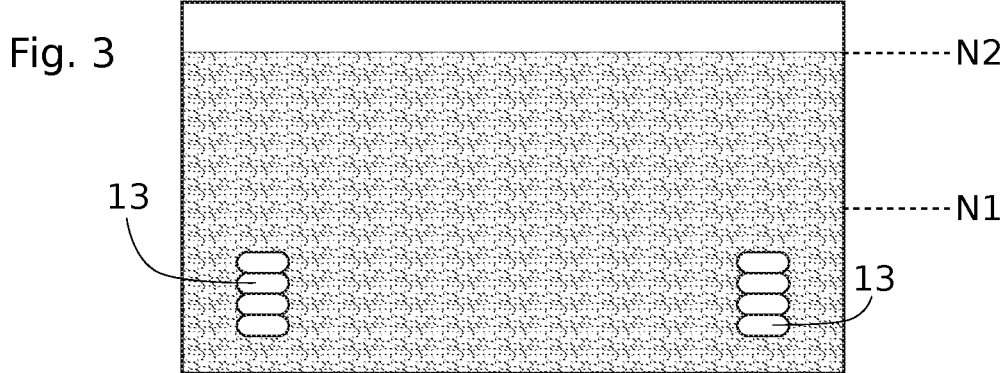
FIG. 3 illustrates another step of printing a first part with the device of FIG. 1.
Figure 4:
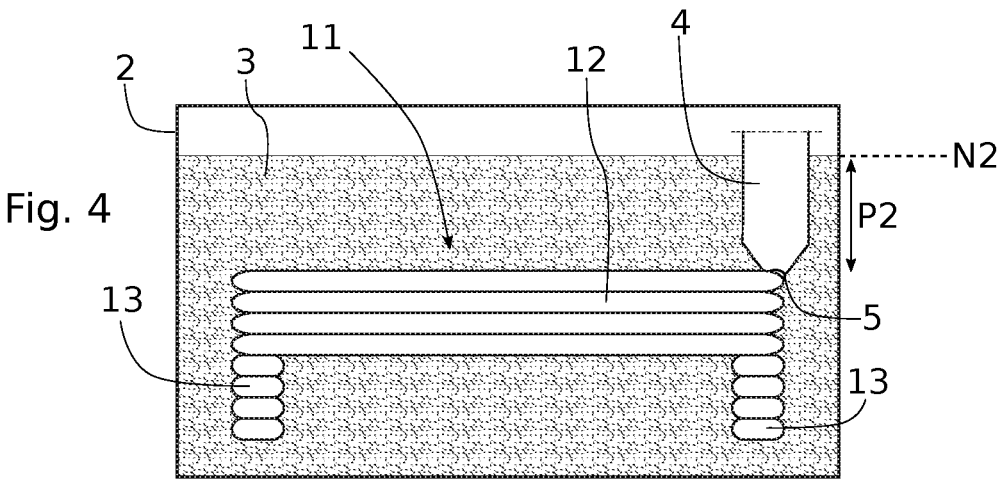
FIG. 4 illustrates another step of printing a first part with the device of FIG. 1.

FIGS. 2 to 4 illustrate an operating sequence of the 3D printing device, in which a three-dimensional part 11 is produced. In this simplified example, the thicknesses have been exaggerated, and the three-dimensional part 11 printed has a gantry-shaped profile, which is impossible to produce by 3D printing fluid silicone without a stressed medium. Even the methods in which a fluid silicone is deposited within a stressed medium made up of a gel do not make such a result possible, taking account of the buoyancy exerted by the gel, which would tend to raise the central portion 12 connecting the two lateral uprights 13 or which, by contrast, would not make it possible to sufficiently support the printed silicone and which would, therefore, result in weakening of this central portion 12, or which would not attain the precise connection of the central portion 12 to the two lateral uprights 13. The stressed medium 3, realized in this case by a granular stressed medium, makes it possible to produce this part by 3D printing, by first of all printing the lateral uprights 13 and then joining them via the central portion 12 bearing against the stressed medium 3.

FIG. 2 illustrates a first step of depositing successive layers making it possible to print the lateral uprights 13, the device being in printing mode. During this step, the level of the stressed medium 3 in the printing tray 2 is at a value N1 corresponding to a printing depth P1. The printing depth is the height of the stressed medium 3 located above the nozzle 5. In this example, this concept is simplified by illustrating the printing depth that extends between the top of the lateral uprights and the surface of the stressed medium 3. In this case, this depth P1 is predetermined and calibrated taking account of the compressive force desired for the printing of the lateral uprights 13.

In a following step, illustrated in FIG. 3, the device changes over to diffusion mode. The diffusion head 9 discharges a thickness of polymer particles over the stressed medium 3. The head support 7 sweeps the surface of the stressed medium 3, in the process being kept at the same altitude, the nozzle 5 then remaining in the stressed medium 3 but being inactive. As a variant, the nozzle 5 may be extracted from the stressed medium. The stressed medium 3 subsequently has a new level N2, higher than the level N1.

Once the lateral uprights 13 have been printed, the central portion 12 is printed in turn, in accordance with FIG. 4, at a printing depth P2 greater than the printing depth P1. During this step, the central portion 12 remains properly rectilinear and correctly connects the two upper faces of the lateral uprights 13.

In this example, the level of the stressed medium 3 is increased to obtain a greater printing depth for the central portion 12 than for the lateral uprights 13. A compressive force adapted to various portions of the part is thus present at the nozzle 5.

The simplified example of FIGS. 2 to 4 describes the basic mechanism of the increase in the level of the stressed medium. This diffusion step making it possible to increase the level of the stressed medium 3 may be implemented each time it is necessary to vary the hydrostatic pressure within a determined range corresponding to a printing thickness, as many times as necessary during the printing of a part.

Figure 5:
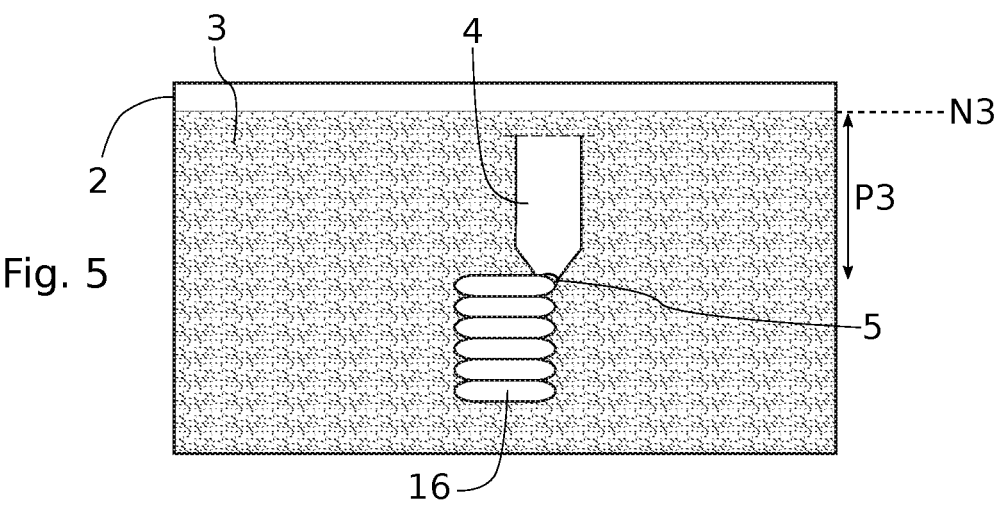
FIG. 5 illustrates a step of printing a second part with the device of FIG. 1.
Figure 6:
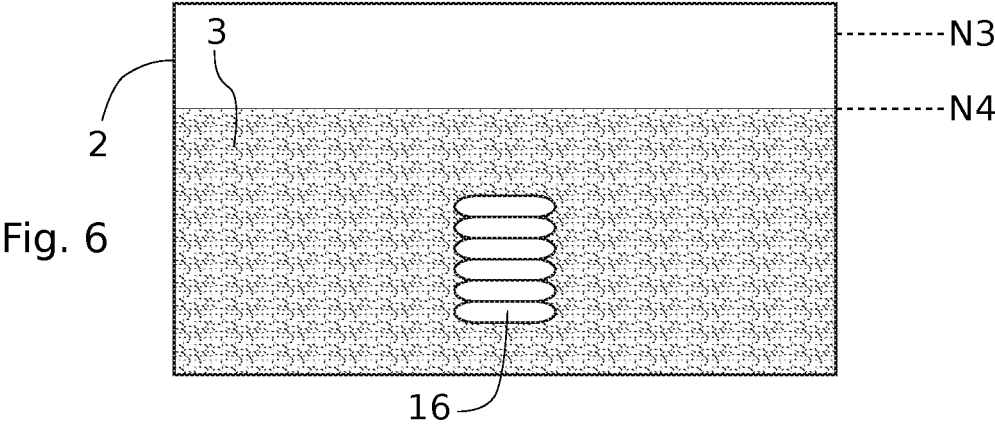
FIG. 6 illustrates another step of printing a second part with the device of FIG. 1.
Figure 7:
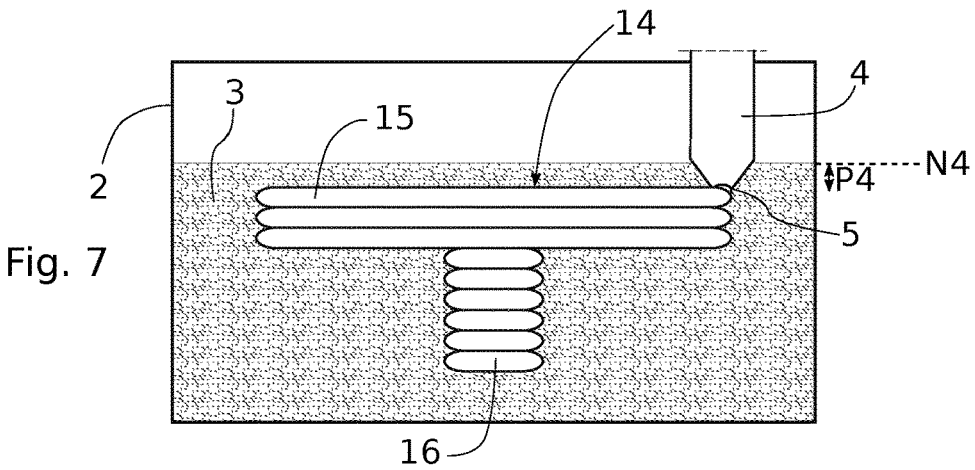
FIG. 7 illustrates another step of printing a second part with the device of FIG. 1.

FIGS. 5 to 7 illustrate a 3D printing sequence in which the level of the stressed medium 3 is reduced through the intervention of the removal head 10.

In this simplified example, the part 14 (see FIG. 7) requires a compressive force at the nozzle 5, which is lower when printing its upper portion 15 than when printing its base 16. This is because an excessively high compressive force may lead to the deformation of some overhanging portions.

The base 16 is first of all printed, in accordance with FIG. 5, with a level N3 of the stressed medium 3 corresponding to a printing depth P3.

Then, as illustrated in FIG. 6, a removal step is performed by the 3D printer in removal mode. The printing head 4 is deactivated (that is to say that the injection of printing material is interrupted) while the removal head 10 applies suction to the surface of the stressed medium 3 to eliminate some of the pulverized polymer and reduce the level of the stressed medium 3 to a level N4, which is less than the level N3.

In a subsequent printing step, illustrated in FIG. 7, the upper portion 15 of the part 14 is printed in a printing depth P4, which is less than the printing thickness P3.

Controlling the level of the stressed medium 3 in the printing tray 2 can not only influence the geometric quality of production of the parts, but also act on the physical properties of the printed part, such as the Young's modulus, the breaking stress or deformation at break, or the thermal and/or acoustic insulation capacity, but also the electrical conductivity or permittivity.

For each printing material and constraining material pair forming the stressed medium 3, the influence of the level of the stressed medium 3 on one or more physical properties can be established. FIG. 8 illustrates this point in that it shows curves resulting from experimental trials establishing the variation in the Young's modulus as a function of the level of the stressed medium 3 in the printing tray 2 for different stressed materials making up the stressed medium. The inventors have produced these curves by virtue of trials at different printing depths of the same printing material (a fluid silicone) in different granular stressed media.

In the graph of FIG. 8:

the curve C1 corresponds to a stressed medium made up of silica;

the curve C2 corresponds to a stressed medium made up of sugar;

the curve C3 corresponds to a stressed medium made up of sand;

the curve C4 corresponds to a stressed medium made up of a mixture of sodium bicarbonate and silica;

the curve C5 corresponds to a stressed medium made up of pulverized PMMA.

The graph of FIG. 8 shows that, for some stressed media, varying the level in the printing tray 2 has a strong influence on the Young's modulus of the finished part (for example, for sugar or sand as stressed medium). One and the same part shape can, therefore, exhibit very different Young's moduli depending on the printing thicknesses implemented in the stressed medium when the part is being printed.

Such an experimental graph can be easily produced for any "material of the stressed medium/printing material" pair by an operator having a 3D printer according to embodiments of the disclosure. The printing depths to which it is preferable to print can thus be determined for a particular part, in a particular stressed medium, and with a particular printing material. It is likewise possible to determine the variations of the level of stressed medium to be implemented in order to modify or keep constant a mechanical property, such as the Young's modulus, within the printed part.

Once this type of graph has been established, it is possible to use it to create a chart indicating a level of stressed medium to be implemented for each printing sequence of the part.

The level of the stressed medium 3 may thus be controlled such that a part having a certain height exhibits the same Young's modulus over its entire height, the level of the stressed medium 3, therefore, being thus modified to maintain the same compressive force at the nozzle 5 of the printing head 4.

Conversely, it is possible to modify the level of the stressed medium 3 such that a portion of the part exhibits a Young's modulus different than the other portions. FIG. 9 illustrates such a case and shows a silicone sphere 24, which is printed according to embodiments of the disclosure and exhibits continuity of material and thickness, a central section Tc, a lower cap section Ti, and an upper cap section Ts. In this illustrative example, the central section Tc is flexible (it, therefore, has a low Young's modulus), whereas the two cap sections Ti, Ts are stiffer (they have a high Young's modulus).

This sphere will be printed in a stressed medium that leads to a Young's modulus for the part that is sensitive to the printing depth (such as sand, for example, in accordance with the experimental data from the graph of FIG. 8). In this regard, the method for obtaining the sphere 24 may have the following steps:

- a first step of printing the lower cap Ti in the stressed medium at a first level corresponding to a printing depth that is significant (for example, 5 cm) and constant for each of the layers making up the lower cap Ti;
- a second, removal step, in which the level of the stressed medium in the tray is reduced to a second level by the action of the removal head 10;
- a third step of printing the central section Tc with a printing depth that is reduced (for example, 1 cm) and constant for each of the layers making up the central section Tc;
- a fourth, diffusion step, in which the level of the stressed medium in the tray is increased to a third level by the action of the diffusion head 9;
- a fifth step of printing the upper cap Ts at a printing depth that is equal to that relating to the lower cap Ti (5 cm in the example), by virtue of the increase in the level of the stressed medium, and is constant for each of the layers making up the upper cap Tc.

The method thus makes it possible to modulate a mechanical characteristic of a part (the Young's modulus in this example) by controlling the level of the stressed medium in the tray, without resorting to changing the material.

As a variant, a different stressed medium may be deposited by the diffusion head 9 during the diffusion steps such that the variation in the Young's modulus (or any physical characteristic that can vary depending on the printing depth) is obtained not only by varying the printing depth, but also by varying the nature of the stressed medium.

Overall, the method according to embodiments of the disclosure may be implemented with a preliminary calibration step consisting in determining a chart establishing the relationship between a physical feature that there is a desire to modulate (or, conversely, to ensure the constancy of), the printing depth, and the nature of the stressed medium. On the basis of this calibration step, a selection step determines the printing depths corresponding to predetermined values of the physical characteristic that are desired for the different sections of the part to be printed. Subsequent 3D printing steps can then be implemented by controlling the level of the stressed medium so as to be within the printing depth ranges determined during the selection step.

FIG. 10 illustrates, schematically and in more detail, the technical means that may be implemented for the diffusion head 9 and removal head 10.

The 3D printing device has a reservoir 17 containing the same material that makes up the stressed medium 3. This reservoir 17 is connected to a hollow ring 20, which is disposed around the printing head 4 and makes up the diffusion head 9, via a duct 18 provided with an injection screw 19. The ring 20 has worm screws 21 for the controlled distribution of the stressed medium from the ring 20. During the diffusion steps, the injection screw 19 is activated and the diffusion of the constraining material present in the reservoir 17 is controlled by the worm screws 21, while the printing head is controlled to traverse the surface of the stressed medium 3.

For its part, the removal head 10 is formed of a suction nozzle 22 connected to suction means 23 for removing a controlled layer of stressed medium 3, and for sending the constrained material that has been drawn in to the reservoir 17. The suction nozzle 22 may be telescopic in order to enable it to be placed close to the surface of the stressed medium 3 in the printing tray 2 so as to proceed with the suction.

According to a variant illustrated in FIG. 11, the device has all the elements of FIG. 10, and in addition makes it possible to add stressed materials with different natures to the stressed medium 3 by virtue of multiple reservoirs (two reservoirs 17 and 17' are illustrated in the example, these reservoirs 17, 17' being connected to the diffusion head by a duct 18, 18'). In this variant, a reservoir selector 25 may be connected to the suction means 23 to direct the drawn-in constraining material toward the reservoir 17, 17' containing the same constraining material. According to this variant, the diffusion head has means for selecting the constraining material to be deposited in the printing tray 2, while the removal head has means for selectively returning the sucked-up constraining material to the correct reservoir.

Variant embodiments of the device and the method according to the disclosure may be implemented without departing from the scope of the disclosure. Notably, the method may be applied to any additive manufacturing method in which the nozzle dispensing the material to be printed is displaced within a stressed medium in the three spatial dimensions, whether this stressed medium is gelled or pulverized and whether it is made up of one and the same material or a mixture of various materials.

Any other physical characteristic, other than the Young's modulus given as an example, may be the subject of a chart for determining its variation in the finished part as a function of the printing depth when choosing a "printed material/ material of the stressed medium" pair, such as, for example, the breaking stress, the thermal or acoustic insulation, the electrical conductivity, etc.

As has just been described, embodiments of the disclosure make it possible to modulate various physical properties of the printed material. Numerous variations may thus be envisaged:

Variations in texture, for example to improve the grip conditions (handle, sole, orthosis, anatomical model, etc.);

Variations in optical properties (partially transparent device, lens, polarizing glass, etc.);

Variations in mechanical properties (bellows, springs, dampers, etc.);

Variations in acoustic properties (acoustic insulation part, acoustic sink, etc.);

Variations in thermal properties (heat sink, thermal insulator, etc.);

Variations in porosity, etc.

Taken on their own or in combination, these different variations made possible by embodiments of the disclosure, the list of which is not exhaustive, make it possible to print objects that can have numerous applications, notably in the health sector, aeronautics sector, automotive sector, railway sector, agri-foodstuff sector, sports sector, luxury sector, etc.

The invention claimed is:

1. An additive manufacturing method including the deposition of a printing material in suspension within a printing tray containing a stressed medium to form a three-dimensional object, this deposition of printing material being realized via at least one step of injecting printing material through a nozzle of a printing head that is dipped into the stressed medium and can be moved within the stressed medium in the three spatial dimensions, wherein this method has at least one step of modifying the level of the stressed medium in the printing tray, and wherein the stressed medium is a granular stressed medium comprising a solid granular phase and an interstitial gaseous phase, the solid granular phase being a mass of discrete solid elements.

2. The method as claimed in claim 1, wherein the method has a step of adjusting the stress exerted by the stressed medium on the printing material.

3. The method as claimed in claim 1, wherein, during a step of modifying the level of the stressed medium in the printing tray, a layer of constraining material different than the material making up the stressed medium in the printing tray is deposited on the surface of the stressed medium.

4. The method as claimed in claim 1, wherein the method has the following successive steps:

a step of printing a portion of the three-dimensional object;

a step of varying the level of the stressed medium in the printing tray; and a step of printing another portion of the three-dimensional object.

5. The method as claimed in claim 1, wherein the method has the following steps:

a preliminary calibration step, in which the relationship between a predetermined physical characteristic and the printing depth in the stressed medium is determined;

a step of selecting printing depths corresponding to predetermined values for the physical characteristic; and steps of printing a part in the stressed medium, at levels of the stressed medium corresponding to the printing depths selected.

6. The method as claimed in claim 1, wherein, during a step of modifying the level of the stressed medium in the printing tray, a layer of constraining material identical to the material making up the stressed medium in the printing tray is deposited on the surface of the stressed medium.

7. The method as claimed in claim 6, wherein the deposition of a layer of constraining material on the stressed medium is realized by diffusion over the entire surface of the stressed medium.

8. The method as claimed in claim 6, wherein the deposition of a layer of constraining material on the stressed medium is realized by a movable diffusion head, and wherein, during a step of modifying the level of the stressed medium in the printing tray, a head support bearing the printing head and the diffusion head is displaced facing the entire surface of the stressed medium, the printing head being deactivated and the diffusion head being activated.

9. The method as claimed in claim 1, wherein, during a step of modifying the level of the stressed medium in the printing tray, a layer of material of the stressed medium is extracted from the printing tray.

10. The method as claimed in claim 9, wherein the extraction of a layer of material of the stressed medium is realized by suction over the entire surface of the stressed medium.

11. The method as claimed in claim 10, wherein the suction is performed by a movable removal head and wherein, during a step of modifying the level of the stressed medium in the printing tray, a head support bearing the printing head and the removal head is displaced facing the entire surface of the stressed medium, the printing head being deactivated and the removal head being activated.

* * * * *